US008485065B2

(12) United States Patent
Blanchard

(10) Patent No.: US 8,485,065 B2
(45) Date of Patent: Jul. 16, 2013

(54) TRANSMISSION DEVICE AND AUTOMOTIVE VEHICLE EQUIPPED WITH SUCH A TRANSMISSION DEVICE

(75) Inventor: Robert Blanchard, Le Boupere (FR)

(73) Assignee: France Reducteurs, Les Herbiers (FR)

( * ) Notice: Subject to any disclaimer, the term of this patent is extended or adjusted under 35 U.S.C. 154(b) by 419 days.

(21) Appl. No.: 12/793,108

(22) Filed: Jun. 3, 2010

(65) Prior Publication Data
US 2010/0307289 A1 Dec. 9, 2010

(30) Foreign Application Priority Data

Jun. 3, 2009 (FR) ...................................... 09 02656

(51) Int. Cl.
*F16H 48/12* (2012.01)
(52) U.S. Cl.
USPC .......................................................... 74/650
(58) Field of Classification Search
USPC .................................. 74/331, 339, 337.5, 650
See application file for complete search history.

(56) References Cited

U.S. PATENT DOCUMENTS

| 3,796,275 | A | | 3/1974 | Bouyer | |
|---|---|---|---|---|---|
| 4,409,858 | A | * | 10/1983 | Lasoen | 74/337.5 |
| 5,150,628 | A | * | 9/1992 | Alfredsson | 74/330 |
| 5,560,461 | A | * | 10/1996 | Loeffler | 192/53.32 |
| 5,626,214 | A | * | 5/1997 | Schlaich et al. | 192/53.34 |
| 6,105,465 | A | * | 8/2000 | Tyson et al. | 74/650 |
| 6,681,654 | B2 | * | 1/2004 | Zentmyer | 74/650 |
| 6,688,194 | B2 | * | 2/2004 | Dissett et al. | 74/650 |
| 6,701,796 | B2 | * | 3/2004 | Blanchard | 74/325 |
| 6,843,748 | B2 | * | 1/2005 | Ma et al. | 475/221 |
| 6,931,956 | B2 | * | 8/2005 | Thery | 74/325 |
| 2003/0234133 | A1 | | 12/2003 | Sugimoto et al. | |
| 2008/0060461 | A1 | * | 3/2008 | Hohn | 74/331 |
| 2008/0060475 | A1 | * | 3/2008 | Mizukawa et al. | 74/650 |
| 2009/0188345 | A1 | * | 7/2009 | Bawks | 74/650 |
| 2010/0307289 | A1 | * | 12/2010 | Blanchard | 74/650 |

OTHER PUBLICATIONS

French Search Report, dated Oct. 2, 2009, from corresponding French application.

* cited by examiner

*Primary Examiner* — David M Fenstermacher
*Assistant Examiner* — Alexander Vu
(74) *Attorney, Agent, or Firm* — Young & Thompson

(57) ABSTRACT

A transmission device for an automotive vehicle of the type includes, mounted on an output shaft formed by at least two wheel drive half-shafts of a vehicle mounted to freely rotate one relative to the other, at least one rotary gearwheel, and two clutch mechanisms with clutch sleeves arranged on both sides of the gearwheel. This device includes, on the one hand, two clutch sleeve configurations: the driving configuration of the gearwheel, and the engine brake configuration of the gearwheel, and, on the other hand, a declutching control mechanism that includes at least one clutch sleeve pilot unit, coaxial to the gearwheel, mounted relative to the gearwheel that moves angularly between two end positions. The declutching pilot unit can be driven into each of the end positions by the two wheel drive half-shafts when they are driven at a speed of rotation that is different from that of the gearwheel.

20 Claims, 4 Drawing Sheets

TRANSMISSION DEVICE AND AUTOMOTIVE VEHICLE EQUIPPED WITH SUCH A TRANSMISSION DEVICE

BACKGROUND OF THE INVENTION

This invention relates to a transmission device as well as an automotive vehicle that is equipped with such a transmission device.

It relates more particularly to a transmission device for an automotive vehicle of the type that comprises, mounted on an output shaft that is formed by at least two wheel drive half-shafts of a vehicle that are mounted to freely rotate one relative to the other, at least one rotary part, of the pinion or wheel type, called a rotary gearwheel, and two clutch mechanisms that are arranged on both sides of the gearwheel, whereby each clutch mechanism of a wheel drive half-shaft with the gearwheel is a clutch sleeve mechanism that comprises clutch sleeve teeth that are arranged on the parts opposite the gearwheel or a part that is integral in rotation with the gearwheel, and a part, such as a sleeve or a ring, that is mounted to move axially and integrally in rotation with said wheel drive half-shaft, whereby said part, called moving clutch sleeve, is equipped with return means in a position in which the moving clutch sleeve teeth come to be housed between two clutch sleeve teeth called the first and second teeth of the gearwheel to make possible a transmission of movement between the gearwheel and the drive half-shafts.

Such transmission devices are increasingly equipped with freewheeling mechanisms that make it possible, in particular for the outside wheel of the vehicle, in cornering, to rotate at a higher speed than the inside wheel. These freewheeling mechanisms that are generally automatically activated during a difference in rotational speed between the moving clutch sleeve and the gearwheel should have an extremely simple design all the while preventing simultaneous freewheeling of the two wheels of the vehicle, for example during a downgrade to prevent any risk of an accident, in particular in the case of a mower or a snowplow.

BRIEF SUMMARY OF THE INVENTION

One object of this invention is therefore to propose a transmission device whose design makes possible, with a reduced number of parts and a simplified structure, the automatic freewheeling of one or the other wheels of the vehicle, in particular in changes of direction, such as the cornering of the vehicle, but prevents any simultaneous freewheeling of the two wheels of the vehicle when the vehicle follows a rectilinear path.

Another object of this invention is to propose a transmission device whose design makes freewheeling possible regardless of whether the vehicle is in forward or reverse.

For this purpose, the invention has as its object a transmission device for an automotive vehicle of the type that comprises an output shaft that is formed by at least two wheel drive half-shafts of a vehicle that are mounted to freely rotate one relative to the other and, mounted on said output shaft, at least one rotary part, of the pinion or wheel type, called a rotary gearwheel, and two clutch mechanisms that are arranged on both sides of the gearwheel, whereby each clutch mechanism of a wheel drive half-shaft with the gearwheel is a clutch sleeve mechanism that comprises a part, such as a sleeve or a ring, called a moving clutch sleeve, mounted to move axially and integrally in rotation with the wheel drive half-shaft, clutch sleeve teeth arranged on the parts opposite the gearwheel or a part that is integral in rotation with the gearwheel and with said moving clutch sleeve, and return means that equip the moving clutch sleeve, whereby said means return the moving clutch sleeve into a position in which any one of the moving clutch sleeve teeth is housed between two clutch sleeve teeth, called the first and second teeth of the gearwheel, to make possible a transmission of movement between the gearwheel and the drive half-shafts, characterized in that the device, in which each tooth of each moving clutch sleeve is mounted with play in the space between the first and second clutch sleeve teeth of the gearwheel, comprises, on the one hand, two clutch sleeve configurations: one called the driving configuration of the gearwheel, in which the teeth of at least one of the moving clutch sleeves that comprise, taken relative to the direction of rotation of the moving clutch sleeve and the gearwheel, a driving or front surface and a driven or rear surface, are shaped to come, by their driven surface, into support contact with the driving surface of the teeth that are provided on the part opposite the gearwheel; and the other called the engine brake configuration of the gearwheel, in which the teeth of at least one of the moving clutch sleeves are shaped to come, by their driving surface, into support contact with the driven surface of the teeth provided on a part opposite the gearwheel, and, on the other hand, a control mechanism for declutching, comprising at least one declutching pilot unit, coaxial to the gearwheel, mounted angularly relative to the moving gearwheel between two end positions, whereby said declutching pilot unit can be driven, in each of the end positions, by the two wheel drive half-shafts when they are driven at a speed of rotation that is different from that of the gearwheel, whereby said declutching pilot unit is able to occupy one of the end positions in driving configuration of the gearwheel and the other end position in the engine brake configuration, whereby said declutching pilot unit is, in at least one end position, able to work with the moving clutch sleeve of the wheel half-shaft that is driven in rotation at a speed of rotation that is different from that of the gearwheel for the switching of said half-shaft from an engaged position to a disengaged position.

Whereby the declutching pilot unit operates automatically, this operation being linked to the relative speed of rotation of the two wheel drive half-shafts relative to that of the gearwheel, any risk of mishandling or any false move is avoided. Furthermore, since each moving clutch sleeve is returned to the clutch sleeve position by elastic return means, the switching from the declutching position to the jaw-clutching position is performed in an extremely short time and the clutch mechanism is extremely reactive, making possible an immediate adaptation of the transmission device to any change in profile of the terrain or any change in direction of the vehicle.

According to a preferred embodiment of the invention, the declutching pilot unit is, in at least one end position, mounted in so-called permanent support contact with the moving clutch sleeve of the wheel half-shaft that is driven at a speed of rotation that is identical to the speed of rotation of the gearwheel, whereby the wheel half-shaft and the moving clutch sleeve form a holding means for the declutching pilot unit in said position.

Preferably, in each of the end positions, the declutching pilot unit is mounted in so-called permanent support contact with the moving clutch sleeve of the wheel half-shaft that is driven at the same speed of rotation as the gearwheel, whereby the wheel half-shaft and the moving clutch sleeve form a means for holding the pilot unit in said position and is able to work with the moving clutch sleeve of the wheel half-shaft that is driven at a speed of rotation that is different from that of the gearwheel for switching said half-shaft from an engaged position to a disengaged position.

Thus, in driving configuration of the gearwheel, the wheel drive half-shaft of the vehicle that can be declutched is the half-shaft that is driven at a speed of rotation that is higher than that of the gearwheel. In other words, in cornering, the outside wheel is declutched and is freewheeling. In an engine brake configuration of the gearwheel, the wheel drive half-shaft of the vehicle that can be declutched is the half-shaft that is driven at a speed of rotation that is less than that of the gearwheel. In other words, in cornering, the inside wheel is declutched and is freewheeling. These declutching processes can be performed regardless of the direction of operation (forward or reverse of the vehicle). In other words, the declutching pilot unit is, in the end position that corresponds to the driving configuration of the gearwheel, able to work with the moving clutch sleeve of the half-shaft that is driven at a speed of rotation that is higher than that of the gearwheel for switching said half-shaft from an engaged position to a disengaged position and, in the end position that corresponds to the engine brake configuration, able to work with the moving clutch sleeve of the half-shaft that is driven at a speed of rotation that is less than that of the gearwheel for the switching of said half-shaft from an engaged position to a disengaged position.

Preferably, in the end position of the declutching pilot unit, the declutching pilot unit and each moving clutch sleeve comprise, for their cooperation for the purpose of switching from an engaged position to a disengaged position, in their opposite parts, cam surfaces that are kept in support contact under the action of said return means of the moving clutch sleeves, whereby said cam surfaces are able—for each moving clutch sleeve, when the declutching pilot unit and said moving clutch sleeve are driven at a different speed of rotation—to cooperate for an axial movement of said moving clutch sleeve along the output shaft in the direction of a separation of said moving clutch sleeve from said declutching pilot unit, and when the declutching pilot unit and said moving clutch sleeve are driven at the same speed to form a means for holding the declutching pilot unit in said position. Thus, the active cam surface of the declutching pilot unit can be considered a roll-away surface that works with an active cam surface of the moving clutch sleeve that forms an activation ramp of the moving clutch sleeve that can cause a retraction of the moving clutch sleeve into the disengaged position during a sliding of said surfaces against one another, resulting from an angular movement of the moving clutch sleeve relative to the declutching pilot unit, whereby said moving clutch sleeve is returned to the engaged position by elastic return means.

Preferably, the declutching pilot unit and each moving clutch sleeve each comprise, in their opposite parts, at least two series of cam surfaces that can be activated selectively and offset angularly, one of the series of cam surfaces of the declutching pilot unit and each moving clutch sleeve being active in a first end position of the declutching pilot unit, and the other series of cam surfaces being active in the other end position of the declutching pilot unit.

The cam surfaces of the declutching pilot unit assume the shape of ramps that are oriented such that each moving clutch sleeve tooth escapes from the interval of clutch sleeve teeth in which it is housed, in the direction of the clutch sleeve tooth of the gearwheel that is opposite to the one against which it is supported in the jaw-clutching configuration that corresponds to said end position of the declutching pilot unit.

The angular play of each moving clutch sleeve tooth in the interval between two jaw-clutching teeth of the gearwheel makes such an escape possible. Preferably, the declutching pilot unit is mounted to be axially stationary relative to the gearwheel. Also preferably, the gearwheel comprises two directions of rotation, one corresponding to the forward operation of the vehicle, and the other corresponding to the reverse operation of the vehicle.

The invention also has as its object a vehicle engine that is characterized in that it is equipped with a transmission device of the above-mentioned type.

BRIEF DESCRIPTION OF THE DRAWING FIGURES

The invention will be better understood from reading the following description of embodiments, with reference to the accompanying drawings, in which.

Figure 1:
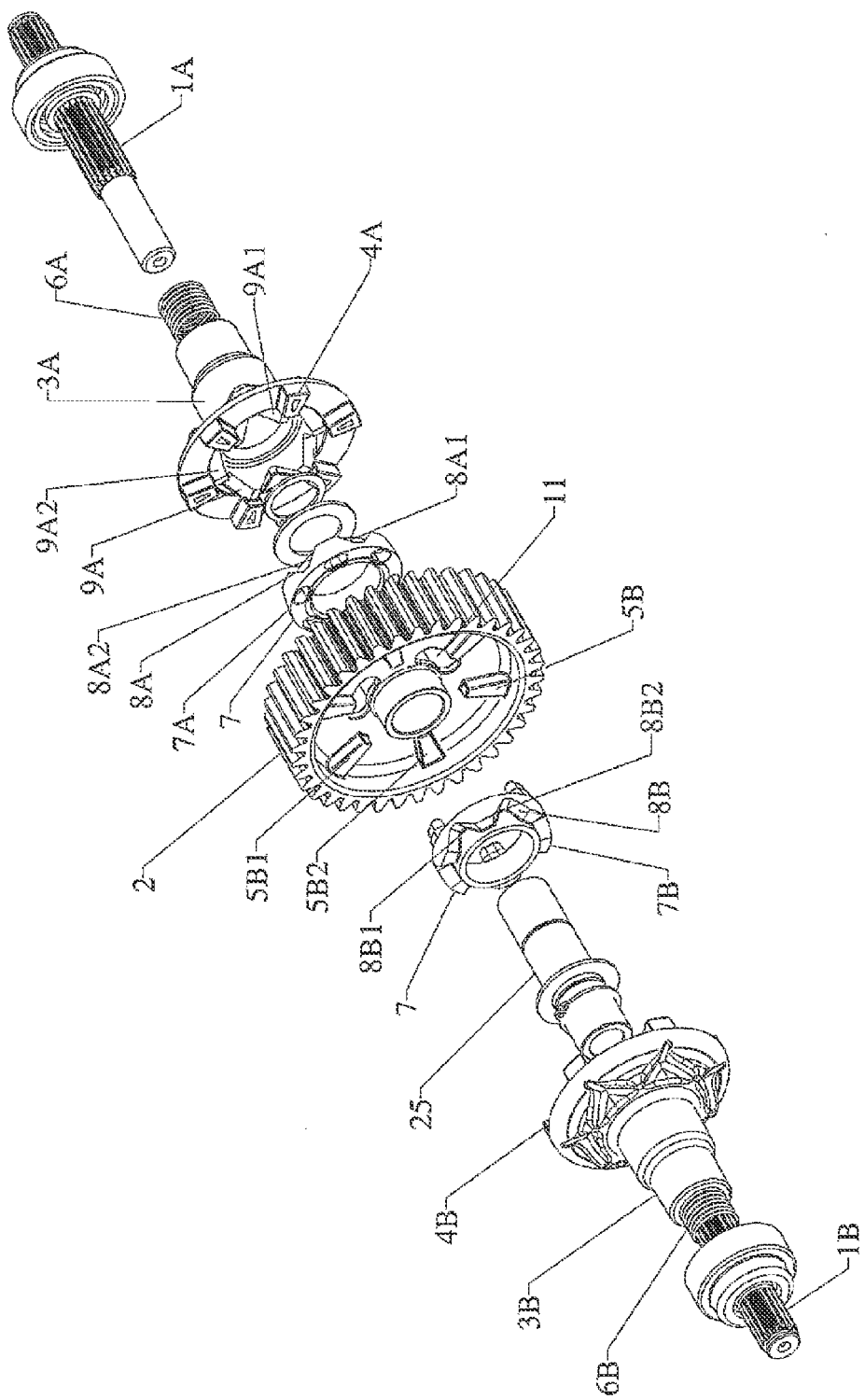
FIG. 1 shows a view in exploded position of the elements of a transmission device according to the invention.

As mentioned above, the transmission device is more particularly intended to be applied to automotive wheeled vehicles, such as snowplows. One engine equips the vehicle. The engine output shaft transmits its movement, for example via an endless belt transmission, to the input shaft 20, such as an endless screw, of a gearbox that is formed by two half-shells assembled by a parting line. The input shaft 20 is engaged generally by engagement with a rotary part 20A, such as a pinion or a wheel. This rotary part 20A transmits, via a clutch mechanism 21, its movement of rotation to a shaft 22 that is equipped with a direction-reversing mechanism 23 with a clutch sleeve for transmitting, generally by engagement, a forward or reverse movement to a rotary part 2 of the pinion or wheel type. Here, a gearwheel 2 has been shown, but it would have been able, in an equivalent manner, to be constituted by a conical pinion. This gearwheel 2 is mounted on an output shaft that is formed by at least two wheel drive half-shafts 1A, 1B of a vehicle, mounted to freely rotate one relative to the other. These two half-shafts 1A, 1B can be equipped directly with wheels of the vehicle or generally are engaged by engagement with at least one other half-shaft that carries a wheel of the vehicle. These two half-shafts 1A, 1B are kept aligned by a tubular connection part 25 that carries the gearwheel 2. This tubular part 25 that is connected by fitting or interlocking at each of the two half-shafts allows a rotation of one of the two half-shafts relative to the other half-shaft. The output shaft therefore comprises at least two half-shafts 1A, 1B and a connecting part 25. Each clutch mechanism of a wheel drive half-shaft 1A, 1B with the gearwheel 2 is a clutch mechanism with a clutch sleeve. Thus, the clutch mechanism of the half-shaft 1A with the gearwheel 2 is a clutch sleeve mechanism that comprises teeth 5A, 4A that are arranged on the parts opposite the gearwheel 2 or a part that is integral in rotation with the gearwheel 2 and a part 3A, such as a sleeve or a ring, mounted to move axially and integrally in rotation with said wheel drive half-shaft 1A. The so-called moving clutch sleeve part 3A is equipped with return means 6A in a position in which any one of the teeth 4A of the moving clutch sleeve is housed between two clutch sleeve teeth 5A, called the first teeth 5A1 and the second teeth 5A2 of the gearwheel 2 to make possible a transmission of movement between gearwheel 2 and drive half-shaft 1A. In the same way, the clutch mechanism of a wheel drive half-shaft 1B with the gearwheel 2 is a clutch mechanism with a clutch sleeve that comprises clutch sleeve teeth 5B, 4B that are arranged on the parts opposite the gearwheel 2 or a part that is integral in rotation with the gearwheel 2 and a part 3B, such as a sleeve or a ring, mounted to move axially and integrally in rotation with the wheel drive half-shaft 1B. The so-called moving clutch sleeve part 3B is equipped with return means 6B in a position in which any one of the teeth 4B of the moving clutch sleeve 3B is housed between two clutch sleeve teeth 5B, said first teeth 5B1 and second teeth 5B2 of the gearwheel 2 for making possible a transmission of movement between gearwheel 2 and wheel drive half-shaft 1B.

For the reader's ease of understanding, in each case, the similar parts will bear the same numerical reference and the letter A for one of the clutch mechanisms and the corresponding parts of the gearwheel and the letter B for the other clutch mechanism and the corresponding parts of the gearwheel.

In a manner that is characteristic of the invention, the device, in which each tooth 4A, 4B of each moving clutch sleeve 3A, 3B is mounted with play in the space between the first teeth 5A1 and the second teeth 5A2 of the clutch sleeve of the gearwheel 2, comprises, on the one hand, two clutch sleeve configurations: one called driving configuration of the gearwheel 2 in which the teeth 4A or respectively 4B of at least one of the moving clutch sleeves 3A or respectively 3B that comprise, taken relative to the direction of rotation of the moving clutch sleeve 3A, 3B and the gearwheel 2, a driving or front surface and a driven or rear surface, are shaped to come, by their driven surface, into support contact with the driving surface of the teeth 5A, 5B that are located on the part opposite the gearwheel 2; and the other called the engine brake configuration of the gearwheel 2, in which each tooth 4A, 4B of at least one of the moving clutch sleeves 3A, 3B is shaped to come, by its driving surface, into support contact with the driven surface of a tooth that is located on a part that is opposite the gearwheel 2, and, on the other hand, a declutching control mechanism that comprises at least one declutching pilot unit 7, coaxial to the gearwheel 2, mounted angularly relative to the moving gearwheel between two end positions, whereby said declutching pilot unit 7 can be driven into each of the end positions by the two wheel drive half-shafts 1A, 1B when they are driven at a speed of rotation that is different from that of the gearwheel 2, whereby said declutching pilot unit 7 is able to occupy one of the end positions in the driving configuration of the gearwheel and the other end position in engine brake configuration, whereby said declutching pilot unit 7 is, in at least one end position, able to work with the moving clutch sleeve 3A or 3B of the wheel half-shaft 1A or 1B that is driven in rotation at a speed of rotation that is different from that of the gearwheel 2 for the switching of said half-shaft 1A or 1B from an engaged position to a disengaged position. In other words, in a driving configuration of the gearwheel 2, the declutching pilot unit 7 occupies an end position and in the engine brake configuration of the gearwheel 2, the declutching pilot unit 7 occupies the other end position, the angular travel of the declutching pilot unit 7 therefore corresponding at most to the value of the angular sector that is formed by two successive teeth of the gearwheel 2.

As shown, the declutching pilot unit 7 is, in each of the end positions, mounted in permanent support contact with the moving clutch sleeve of the wheel half-shaft that is driven at a speed of rotation that is identical to the speed of rotation of the gearwheel 2, with the wheel half-shaft and moving clutch sleeve forming a means for holding the declutching pilot unit 7 in said position, and is able to work with the moving clutch sleeve of the wheel half-shaft that is driven at a speed of rotation that is different from that of the gearwheel 2 for the switching of said half-shaft from an engaged position to a disengaged position. Thus, the declutching pilot unit 7 is, in each of these end positions, mounted in so-called permanent support contact with the moving clutch sleeve 3A of the wheel half-shaft 1A that is driven at the same speed of rotation as the gearwheel 2, the wheel half-shaft 1A and the moving clutch sleeve 3A forming a means for holding the pilot unit 7 in said position, and is able to work with the moving clutch sleeve 3B of the wheel half-shaft 1B that is driven at a speed of rotation that is different from that of the gearwheel 2 for the switching of the half-shaft 1B from an engaged position to a disengaged position. Each time, the declutching pilot unit, which is shown by the reference 7, comprises a part 7A that works with the moving clutch sleeve 3A and a part 7B that works with the moving clutch sleeve 3B, whereby the parts 7A and 7B are mounted integrally in rotation. Thus, the declutching pilot unit 7 is, in the end position corresponding to the driving configuration of the gearwheel 2, able to work with the moving clutch sleeve 3A or 3B of the half-shaft 1A or 1B that is driven at a speed of rotation that is higher than that of the gearwheel 2 for the switching of said half-shaft 1A, 1B from an engaged position to a disengaged position, and, in the end position that corresponds to the engine brake configuration, able to work with the moving clutch sleeve 3A or 3B of the half-shaft 1A or 1B that is driven at a speed of rotation that is less than that of the gearwheel 2 for the switching of said half-shaft 1A, 1B from an engaged position to a disengaged position.

In the end position, the declutching pilot unit 7 and each moving clutch sleeve 3A, 3B comprise—for their cooperation for the purpose of switching from an engaged position to a disengaged position, in their opposite parts—cam surfaces 8A, 9A, 8B, 9B that are kept in support contact under the action of said return means 6A of moving clutch sleeves 3A, 3B, whereby said cam surfaces 8A, 9A or respectively 8B, 9B are able—for the moving clutch sleeve 3A or respectively 3B, when the declutching pilot unit 7 and said moving clutch sleeve are driven at a different speed of rotation—to cooperate for an axial movement of said moving clutch sleeve 3A or respectively 3B along the output shaft in the direction of a separation of said moving clutch sleeve 3A or respectively 3B of said declutching pilot unit 7, and when the declutching pilot unit 7 and said moving clutch sleeve 3A or respectively 3B are driven at the same speed to form a means for holding the declutching pilot unit 7 in said position.

Thus, the declutching pilot unit 7, in particular the part 7A of the declutching pilot unit, and the moving clutch sleeve 3A comprise—for their cooperation for the purpose of switching from an engaged position to a disengaged position, in their opposite parts—cam surfaces 8A, 9A that are kept in support contact under the action of said return means 6A of the moving clutch sleeve 3A, whereby said cam surfaces 8A, 9A are able—for said moving clutch sleeve 3A, when the declutching pilot unit 7 and said moving clutch sleeve are driven at a different speed of rotation—to cooperate for an axial movement of said moving clutch sleeve 3A along the output shaft in the direction of a separation of said moving clutch sleeve 3A from said declutching pilot unit 7, in particular the part 7A of said pilot unit, and when the declutching pilot unit 7 and said moving clutch sleeve 3A are driven at the same speed to form a means for holding the declutching pilot unit 7 in said position. It is the same for the moving clutch sleeve 3B.

Generally, the declutching pilot unit 7 and each moving clutch sleeve 3A, 3B each comprise, in their opposite parts, at least two series 8A1, 8A2; 9A1, 9A2; 8B1, 8B2; 9B1, 9B2 of cam surfaces that can be activated selectively and offset angularly, whereby one of the series of cam surfaces of the declutching pilot unit and of each moving clutch sleeve is active in a first end position of the declutching pilot unit, and the other series of cam surfaces is active in the other end position of the declutching pilot unit.

Thus, the part 7A of the clutch sleeve pilot unit 7 comprises two series 8A1, 8A2 of the cam surfaces that are selectively activatable, whereby said cam surfaces are able to work with the surfaces 9A1, 9A2 of the moving clutch sleeve 3A, the surfaces 8A1 working with the surfaces 9A1, while the surfaces 8A2 of the part 7A of the clutch sleeve pilot unit 7 work with the parts 9A2 of the moving clutch sleeve 3A.

In the same manner, the part 7B of the declutching pilot unit 7 comprises two series 8B1, 8B2 of cam surfaces that can work with the surfaces 9B1, 9B2 of the moving clutch sleeve 3B, the surfaces 8B1 working with the surfaces 9B1, and the surfaces 8B2 with the surfaces 9B2.

In the examples that are shown, the cam surfaces 8A, 8B of the declutching pilot unit 7 assume the shape of ramps that are oriented such that each tooth 4A or respectively 4B of the moving clutch sleeve 3A or respectively 3B escapes from the interval of clutch sleeve teeth 5A1, 5A2 or respectively 5B1, 5B2 in which it is housed, in the direction of the clutch sleeve tooth of the gearwheel that is opposite to the one against which it is supported in the jaw-clutching configuration that corresponds to said end position of the declutching pilot unit.

The cam surfaces 8A, 8B of the cam declutching pilot unit 7 form a V series, with one of the branches of the V forming the first series of ramps, and the other branch of the V forming the second series of ramps.

The declutching pilot unit 7 assumes the shape of a wheel, housed inside the gearwheel 2 and comprising, on each of its surfaces, at least two cam surface series 8A1, 8A2; 8B1, 8B2, whereby said wheel is formed by assembling two cam-carrying plate wheels, whereby the zones for connecting said plate wheels to one another are mounted to move angularly inside the openings 11 that are located along a circle that is arranged in the fabric of the gearwheel 2.

Each moving clutch sleeve 3A, 3B assumes the shape of a sleeve that is mounted integrally in rotation with the wheel drive half-shaft 1A, 1B that carries it by means of grooves, whereby said sleeve comprises—at or in the vicinity of one of its ends—a first plate that carries the cam surfaces 9A, 9B that are complementary to the cam surfaces 8A, 8B that are positioned on the declutching pilot unit 7 and a second plate that is coaxial to said first plate, whereby said second plate carries the teeth 4A or respectively 4B of said clutch sleeve 3A or respectively 3B.

It is noted that the declutching pilot unit 7 is mounted to be axially stationary relative to the gearwheel 2.

Likewise, the gearwheel 2 comprises two directions of rotation, one corresponding to the forward operation of the vehicle, and the other corresponding to the reverse operation of the vehicle.

Figure 3:
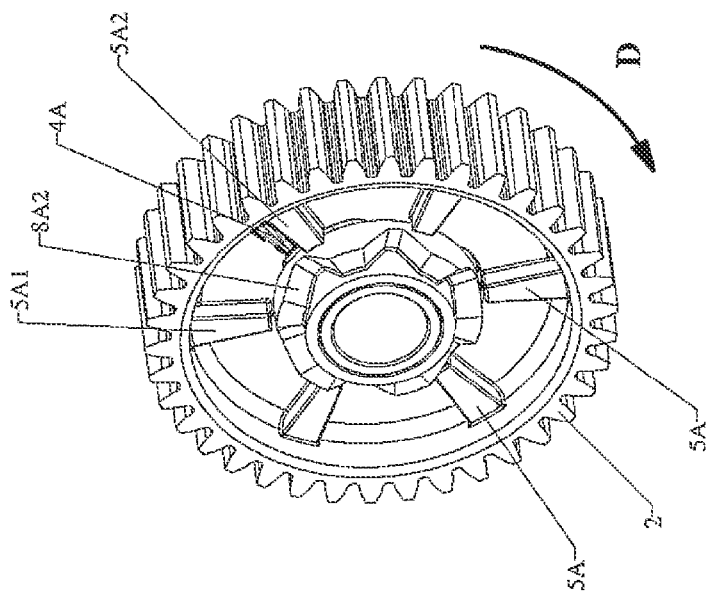
FIG. 3 shows a perspective view of the gearwheel and the declutching pilot unit in driving configuration of the gearwheel, whereby teeth of the moving clutch sleeve have been shown in dotted lines.
Figure 4:
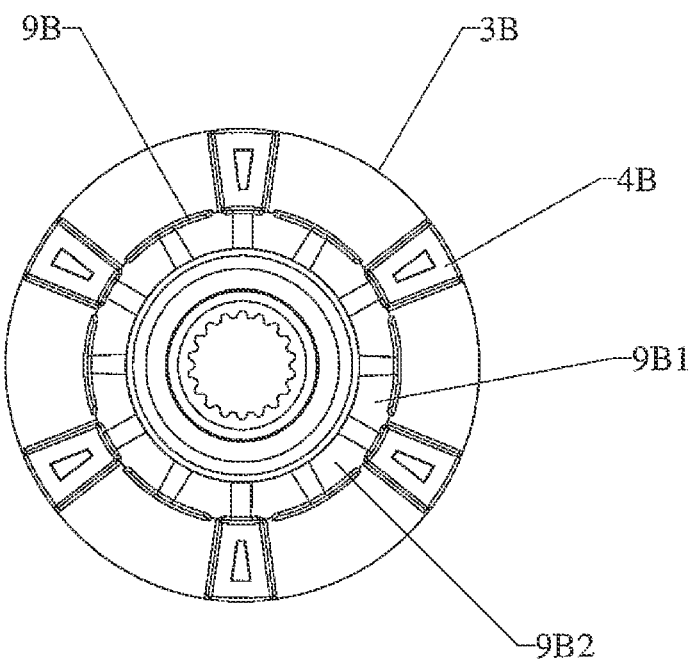
FIG. 4 shows a perspective view of one of the moving clutch sleeves.
Figure 5:
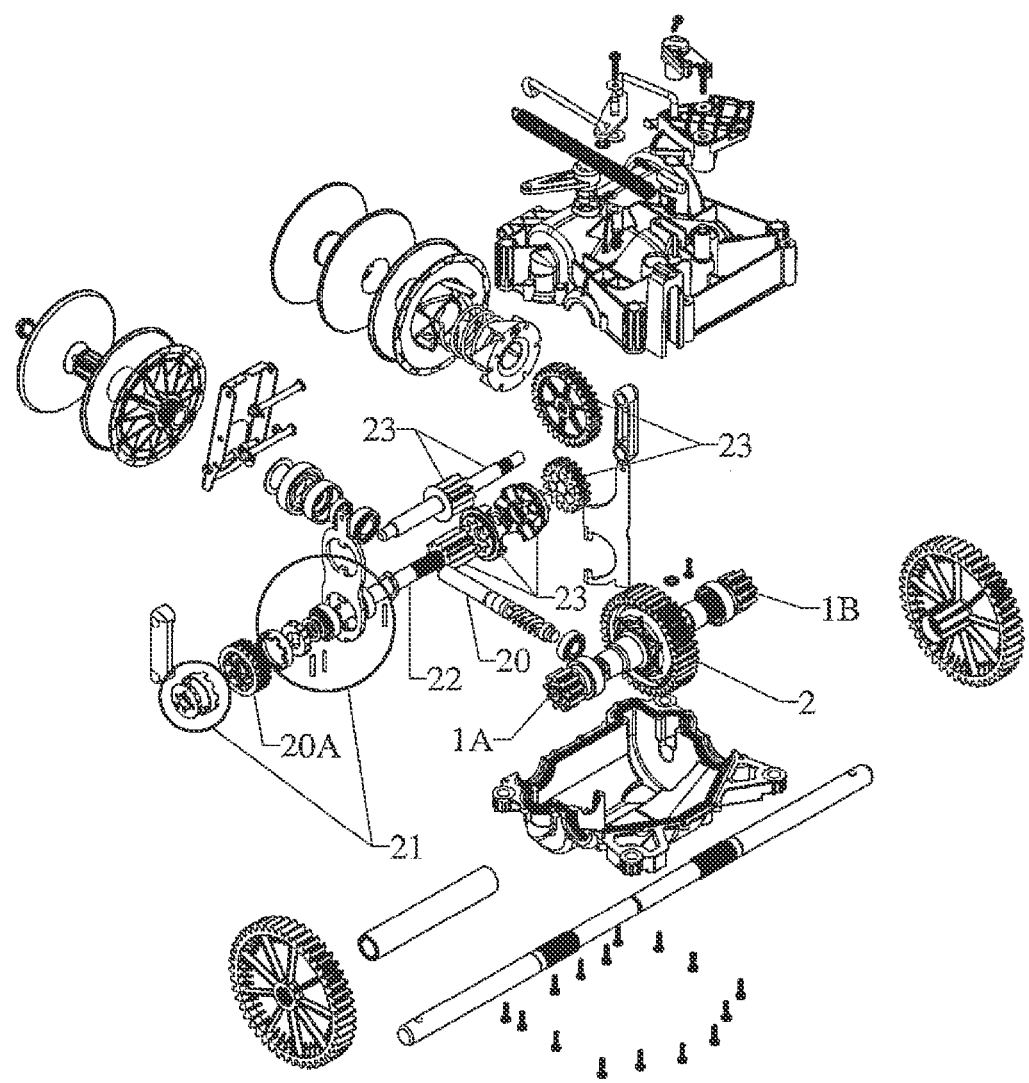
FIG. 5 shows a perspective view, in exploded position, of the elements that constitute it, a transmission device housed inside a gearbox that also contains a mechanism for reversing the direction of the vehicle.

The operation of such a transmission device is as follows. In a driving configuration of the gearwheel 2, as shown in FIG. 3, the gearwheel 2 rotates in the direction D, which can correspond to either the forward or reverse operation of the vehicle. The teeth 4A of the moving clutch sleeve 3A are, by their driven or rear surface, supported against the driving surface of the teeth 5A1 and 5A2 that are carried by one of the surfaces of the gearwheel. In FIG. 3, a single tooth 4A of the clutch sleeve 3A has been shown in dotted lines for the sake of simplicity in reading the drawing. In the same manner, to facilitate understanding below, all of the identical parts on the moving clutch sleeves 3A and 3B bear the same numerical references followed by the letter A for one of the clutch sleeves and the letter B for the other clutch sleeve; it is the same for the parts of the gearwheel that, when they work with the moving clutch sleeve 3A, are followed by the letter A, and when they work with the moving clutch sleeve 3B, are followed by the letter B.

In this driving configuration of the gearwheel, the moving clutch sleeve 3A and the half-shaft 1A, whose moving clutch sleeve 3A is integral in rotation, are driven at a speed of rotation that is identical to that of the gearwheel. The declutching pilot unit, in particular the part 7A of the pilot unit, is held by cooperation of its cam surfaces 8A1 with the cam surfaces 9A1 of the moving clutch sleeve 3A in an end angular position that corresponds to or is close to a stop position in which the connecting zones of the conical plates of said declutching pilot unit would be supported against the rear edge of the openings 11 that are located in the fabric of the gearwheel 2. The part 7B of the declutching pilot unit 7 is held in the same angular position. When the half-shaft 1B is driven at the same speed as the gearwheel, the moving clutch sleeve 3B, and in particular the teeth 4B of said clutch sleeve, can occupy, relative to the teeth 5B1, 5B2 of the gearwheel, the same position as the one that is shown for the moving clutch sleeve 3A. When one of the two half-shafts, for example the half-shaft 1A, is driven at a speed of rotation that is higher than that of the gearwheel by one of the wheels of the vehicle, because of, for example, a change in direction of the vehicle, the angular movement of the moving clutch sleeve 3A relative to the declutching pilot unit 7 that is allowed thanks to the angular play between teeth causes a sliding of the surface 9A1 of the clutch sleeve 3A against the surface 8A1 of the declutching pilot unit. Because of the shape of the cam surfaces or support surfaces opposite, this sliding causes an axial movement of the moving clutch sleeve 3A in the direction of a separation of the gearwheel 2. The continuation of driving in rotation the moving clutch sleeve 3A that is integral in rotation with the half-shaft 1A and its axial movement make it possible for the tooth 4A of said moving clutch sleeve 3A, arranged in the interval 5A1, 5A2 in FIG. 3, to switch from a support position against the driving surface of the tooth 5A1 of the gearwheel 2 to a support position against the driving surface of the tooth 5A2 of the gearwheel 2. This movement from interval to interval jumping from one interval to the next continues as long as the half-shaft 1A and the associated moving clutch sleeve 3A are driven at a speed of rotation that is higher than that of the gearwheel. During this angular movement, the return means 6A of the moving clutch sleeve 3A tend to return the moving clutch sleeve 3A into the position that is brought close together with the gearwheel, whereas the cam surfaces opposite the declutching pilot unit and the moving clutch sleeve 3A tend to separate the moving clutch sleeve from the gearwheel.

Figure 2:
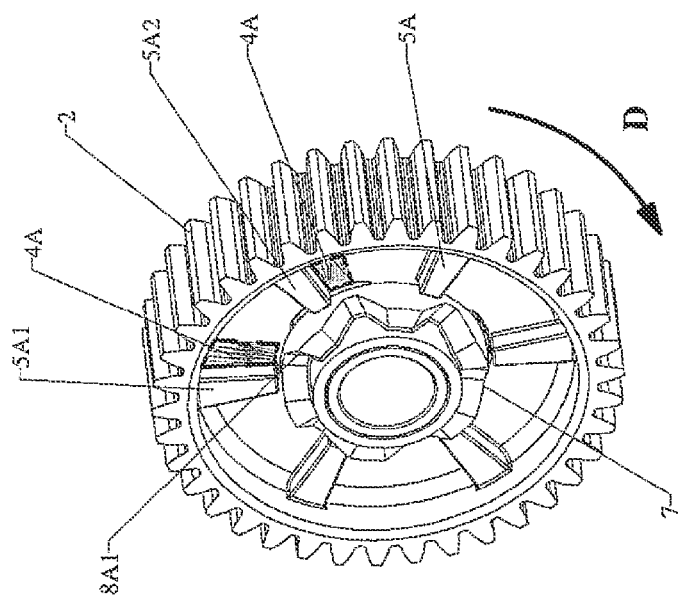
FIG. 2 shows a perspective view of the gearwheel and the declutching pilot unit in engine brake configuration of the gearwheel, whereby the teeth of the moving clutch sleeve have been shown in dotted lines.

Quite obviously, the mode of operation described above would have been analogous if it were the moving clutch sleeve 3B and its associated half-shaft 1B that had been driven at a speed of rotation that is higher than that of the gearwheel 2. When the two wheel half-shafts are driven by the wheels of the vehicle at a speed that is higher than that of the gearwheel 2, for example when the vehicle takes on a downgrade, the device switches into the engine brake configuration, as shown in FIG. 2. The gearwheel 2 rotates in the direction that is indicated by the arrow D. In the engine brake configuration of the gearwheel, the teeth 4A of the moving clutch sleeve 3A are, by their driving surfaces, in support contact against the driven surface of the teeth 5A of the gearwheel 2. It can be the same for the teeth 4B of the clutch sleeve 3B with the teeth 5B of the gearwheel. The declutching pilot unit 7 is held by cooperation of its cam surfaces 8A1 with the cam surfaces 9A1 in an end angular position that corresponds to, or is close to, a stop position in which the connecting zones of the cam plates of said pilot unit would be supported against the front edge of the openings 11 that are located in the fabric of the gearwheel. The part 7B of the declutching pilot unit 7 is held in the same angular position when the half-shaft 1B is driven at the same speed as the gearwheel. When one of the two half-shafts, for example the half-shaft 1A, is driven at a speed of rotation that is less than that of the gearwheel, the declutching pilot unit is held in its end angular position by the half-shaft 1B that is driven at the same speed of rotation as the gearwheel.

DETAILED DESCRIPTION OF THE INVENTION

As a result, the cam surfaces 9A2 of the moving clutch sleeve 3A tend to slide against the cam surfaces 8A2 of the pilot unit, in particular the part 7A of the pilot unit 7, and cause an axial movement of the moving clutch sleeve 3A in the direction of a separation of the gearwheel 2. This separation makes it possible for the tooth 4A of the moving clutch sleeve 3A to exit from the interval that is formed by the clutch sleeve teeth 5A1, 5A2 of the gearwheel 2 inside of which it is housed by exiting via the tooth 5A1 in FIG. 2 whereas it was supported against the tooth 5A2. It therefore switches from a support position against the driven surface of the tooth 5A2 to a support position against the driven surface of the tooth 5A1. This movement from interval to interval jumping from one interval to the next continues as long as the half-shaft 1A and the associated moving clutch sleeve are driven at a speed of rotation that is higher than that of the gearwheel. During this angular movement, the return means 6A of the moving clutch sleeve 3A tend to return the moving clutch sleeve 3A into the position that is brought close together with the gearwheel whereas the cam surfaces opposite the declutching pilot unit and the moving clutch sleeve 3A tend to separate the moving clutch sleeve from the gearwheel. When the two half-shafts and the associated moving clutch sleeves are both driven at a speed of rotation that is less than that of the gearwheel, there is a return to the driving configuration of the gearwheel. The device therefore switches constantly from one configuration to the next in the driven-in-rotation state of the gearwheel 2. It is noted that in the driving configuration, the half-shaft with the associated moving clutch sleeve, which are driven at a speed of rotation that is higher than that of the gearwheel, can be declutched, whereas in the engine brake configuration, the half-shaft with the associated moving clutch sleeve, which are driven at a speed of rotation that is less than that of the gearwheel, can be declutched. The operation is identical in forward and in reverse. The operation is completely automatic and is connected only to the relative speeds of the different parts. The number of parts is small; the effect of this is that the device is simple.

The invention claimed is:

1. A transmission device for an automotive vehicle, comprising:
   two wheel drive half-shafts (1A, 1B) mounted to freely rotate one relative to each other, the two wheel drive half shafts defining an output shaft;
   a rotary gearwheel (2) mounted on said output shaft;
   two clutch mechanisms, a respective one of said clutch mechanisms arranged on each of opposite sides of the rotary gearwheel (2) and is associated with a respective one of the wheel drive half-shafts (1A, 1B),
   wherein each clutch mechanism is a clutch sleeve mechanism comprises
   i) a moving clutch sleeve (3A, 3B) mounted to move axially and integrally in rotation with the associated wheel drive half-shaft (1A, 1B),
   ii) two sets of clutch sleeve teeth (5A, 5B; 4A, 4B) arranged opposite each other, and including
      a first set of clutch sleeve teeth (4A, 4B) arranged on the moving clutch sleeve (3A, 3B), and
      a second set of clutch sleeve teeth (5A, 5B) of the gearwheel (2), the second set of clutch sleeve teeth (5A, 5B) borne i) by the gearwheel (2) or ii) by a part that is integral in rotation with the gearwheel, the second set of clutch sleeve teeth (5A, 5B) of the gearwheel (2) directly meshing with the first set of clutch teeth (4A, 4B) of the moving clutch sleeve (3A, 3B), and
   iii) return means (6A, 6B) that equip the moving clutch sleeve (3A, 3B) and return the moving clutch sleeve (3A, 3B) into a position in which any one of the clutch sleeve teeth (4A, 4B) of the moving clutch sleeve (3A, 3B) is housed between first teeth moving clutch sleeve teeth (5A1, 5B1) and second moving clutch sleeve teeth (5A2, 5B2) of the gearwheel (2) to make a transmission of movement between the gearwheel (2) and the drive half-shafts (1A, 1B),
   wherein each clutch sleeve tooth (4A, 4B) of each moving clutch sleeve (3A, 3B) is mounted with play in a space between the first moving clutch sleeve teeth (5A1, 5B1) and the second clutch moving sleeve teeth (5A2, 5B2) of the gearwheel (2), and comprises
   two clutch sleeve configurations:
   i) a driving configuration of the gearwheel (2), in which the clutch sleeve teeth (4A, 4B) of at least one of the moving clutch sleeves (3A, 3B) that comprise, taken relative to the direction of rotation of the moving clutch sleeve (3A, 3B) and the gearwheel (2), a driving or front surface and a driven or rear surface, are shaped to come, by their driven surface, into support contact with a driving surface of the clutch sleeve teeth (5A, 5B) of the gearwheel (2); and
   ii) an engine brake configuration of the gearwheel (2), in which the clutch sleeve teeth (4A, 4B) of at least one of the moving clutch sleeves (3A, 3B) are shaped to come, by their driving surface, into support contact with the driven surface of the teeth (5A, 5B) of the gearwheel (2), and,
      a control mechanism for declutching, comprising at least one declutching pilot unit (7), coaxial to the gearwheel (2), mounted angularly relative to the gearwheel (2) between two end positions,
   wherein said declutching pilot unit (7) is drivable, in each of the end positions, by the two wheel drive half-shafts (1A, 1B) when two wheel drive half-shafts (1A, 1B) are driven at a speed of rotation that is different from a speed of rotation of the gearwheel (2),
   wherein said declutching pilot unit (7) occupies one of the end positions in the driving configuration of the gearwheel and another end position in the engine brake configuration,
   wherein said declutching pilot unit (7) is, in at least one end position, works with the moving clutch sleeve (3A or 3B) of the wheel half-shaft (1A or 1B) that is driven in rotation at a speed of rotation that is different from a speed of rotation of the gearwheel (2) for the switching of said half-shaft (1A or 1B) from an engaged position to a disengaged position.

2. A transmission device according to claim 1, wherein the declutching pilot unit (7) is, in at least one end position, mounted in permanent support contact with the moving clutch sleeve (3A, 3B) of the wheel half-shaft (1A, 1B) that is driven at a speed of rotation that is identical to the speed of rotation of the gearwheel (2), and wherein the wheel half-shaft (1A, 1B) and the moving clutch sleeve (3A; 3B) form a means for holding the declutching pilot unit (7) in said position.

3. A transmission device according to claim 2, wherein the declutching pilot unit (7) is, in each of the end positions, mounted in permanent support contact with the moving clutch sleeve (3A; 3B) of the wheel half-shaft (1A; 1B) that is driven at the same speed of rotation as the gearwheel (2), and wherein the wheel half-shaft (1A; 1B) and the moving clutch sleeve (3A; 3B) form a means for holding the pilot unit (7) in said position and works with the moving clutch sleeve (3B; 3A) of the wheel half-shaft (1B; 1A) that is driven at a speed of rotation that is different from that of the gearwheel (2) for the switching of said half-shaft (1B; 1A) from an engaged position to a disengaged position.

4. A transmission device according to claim 2, wherein the declutching pilot unit (7) is, in the end position that corresponds to the driving configuration of the gearwheel (2), works with the moving clutch sleeve (3A, 3B) of the half-shaft (1A, 1B) that is driven at a speed of rotation that is higher than that of the gearwheel (2) for the switching of said half-shaft (1A, 1B) from an engaged position to a disengaged position and, in the end position that corresponds to the engine brake configuration, works with the moving clutch sleeve (3A, 3B) of the half-shaft (1A, 1B) that is driven at a speed of rotation that is less than that of the gearwheel (2) for the switching of said half-shaft (1A, 1B) from an engaged position to a disengaged position.

5. A transmission device according to claim 2, wherein in the end position of the declutching pilot unit (7), the declutching pilot unit (7) and each moving clutch sleeve (3A, 3B) comprise, for their cooperation for the purpose of switching from an engaged position to a disengaged position, in their opposite parts, cam surfaces (8A, 9A; 8B, 9B) that are kept in support contact under the action of said return means (6A) of the moving clutch sleeves (3A, 3B), and wherein said cam surfaces (8A, 9A; 8B, 9B) are able, for each moving clutch sleeve, when the declutching pilot unit (7) and said moving clutch sleeve are driven at a different speed of rotation, to cooperate for an axial movement of said moving clutch sleeve (3A, 3B) along the output shaft in the direction of a separation of said moving clutch sleeve (3A, 3B) from said declutching pilot unit (7) and when the declutching pilot unit (7) and said moving clutch sleeve (3A, 3B) are driven at the same speed to form a means for holding the declutching pilot unit (7) in said end position.

6. A transmission device according to claim 2, wherein the declutching pilot unit (7) and each moving clutch sleeve (3A, 3B) each comprise, in their opposite parts, at least two series (8A1, 8A2; 9A1, 9A2); (8B1, 8B2; 9B1, 9B2) of cam surfaces activated selectively and offset angularly, one of the series of cam surfaces of the declutching pilot unit and each moving clutch sleeve being active in one of the end positions of the declutching pilot unit, and another of the series of cam surfaces being active in another end position of the declutching pilot unit.

7. A transmission device according to claim 1, wherein the declutching pilot unit (7) is, in each of the end positions, mounted in permanent support contact with the moving clutch sleeve (3A; 3B) of the wheel half-shaft (1A; 1B) that is driven at the same speed of rotation as the gearwheel (2), and wherein the wheel half-shaft (1A; 1B) and the moving clutch sleeve (3A; 3B) form a means for holding the pilot unit (7) in said position and works with the moving clutch sleeve (3B; 3A) of the wheel half-shaft (1B; 1A) that is driven at a speed of rotation that is different from that of the gearwheel (2) for the switching of said half-shaft (1B; 1A) from an engaged position to a disengaged position.

8. A transmission device according to claim 7, wherein the declutching pilot unit (7) is, in the end position that corresponds to the driving configuration of the gearwheel (2), works with the moving clutch sleeve (3A, 3B) of the half-shaft (1A, 1B) that is driven at a speed of rotation that is higher than that of the gearwheel (2) for the switching of said half-shaft (1A, 1B) from an engaged position to a disengaged position and, in the end position that corresponds to the engine brake configuration, works with the moving clutch sleeve (3A, 3B) of the half-shaft (1A, 1B) that is driven at a speed of rotation that is less than that of the gearwheel (2) for the switching of said half-shaft (1A, 1B) from an engaged position to a disengaged position.

9. A transmission device according to claim 7, wherein in the end position of the declutching pilot unit (7), the declutching pilot unit (7) and each moving clutch sleeve (3A, 3B) comprise, for their cooperation for the purpose of switching from an engaged position to a disengaged position, in their opposite parts, cam surfaces (8A, 9A; 8B, 9B) that are kept in support contact under the action of said return means (6A) of the moving clutch sleeves (3A, 3B), and wherein said cam surfaces (8A, 9A; 8B, 9B) are able, for each moving clutch sleeve, when the declutching pilot unit (7) and said moving clutch sleeve are driven at a different speed of rotation, to cooperate for an axial movement of said moving clutch sleeve (3A, 3B) along the output shaft in the direction of a separation of said moving clutch sleeve (3A, 3B) from said declutching pilot unit (7) and when the declutching pilot unit (7) and said moving clutch sleeve (3A, 3B) are driven at the same speed to form a means for holding the declutching pilot unit (7) in said end position.

10. A transmission device according to claim 1, wherein the declutching pilot unit (7) is, in the end position that corresponds to the driving configuration of the gearwheel (2), works with the moving clutch sleeve (3A, 3B) of the half-shaft (1A, 1B) that is driven at a speed of rotation that is higher than that of the gearwheel (2) for the switching of said half-shaft (1A, 1B) from an engaged position to a disengaged position and, in the end position that corresponds to the engine brake configuration, works with the moving clutch sleeve (3A, 3B) of the half-shaft (1A, 1B) that is driven at a speed of rotation that is less than that of the gearwheel (2) for the switching of said half-shaft (1A, 1B) from an engaged position to a disengaged position.

11. A transmission device according to claim 10, wherein in the end position of the declutching pilot unit (7), the declutching pilot unit (7) and each moving clutch sleeve (3A, 3B) comprise, for their cooperation for the purpose of switching from an engaged position to a disengaged position, in their opposite parts, cam surfaces (8A, 9A; 8B, 9B) that are kept in support contact under the action of said return means (6A) of the moving clutch sleeves (3A, 3B), and wherein said cam surfaces (8A, 9A; 8B, 9B) are able, for each moving clutch sleeve, when the declutching pilot unit (7) and said moving clutch sleeve are driven at a different speed of rotation, to cooperate for an axial movement of said moving clutch sleeve (3A, 3B) along the output shaft in the direction of a separation of said moving clutch sleeve (3A, 3B) from said declutching pilot unit (7) and when the declutching pilot unit (7) and said moving clutch sleeve (3A, 3B) are driven at the same speed to form a means for holding the declutching pilot unit (7) in said end position.

12. A transmission device according to claim 1, wherein in the end position of the declutching pilot unit (7), the declutching pilot unit (7) and each moving clutch sleeve (3A, 3B) comprise, for their cooperation for the purpose of switching from an engaged position to a disengaged position, in their opposite parts, cam surfaces (8A, 9A; 8B, 9B) that are kept in support contact under the action of said return means (6A) of the moving clutch sleeves (3A, 3B), and wherein said cam surfaces (8A, 9A; 8B, 9B) are able, for each moving clutch sleeve, when the declutching pilot unit (7) and said moving clutch sleeve are driven at a different speed of rotation, to cooperate for an axial movement of said moving clutch sleeve (3A, 3B) along the output shaft in the direction of a separation of said moving clutch sleeve (3A, 3B) from said declutching pilot unit (7) and when the declutching pilot unit (7) and said moving clutch sleeve (3A, 3B) are driven at the same speed to form a means for holding the declutching pilot unit (7) in said end position.

13. A transmission device according to claim 12, wherein the cam surfaces (8A, 8B) of the declutching pilot unit (7) have a shape of ramps that are oriented such that each tooth (4A, 4B) of the moving clutch sleeve (3A, 3B) escapes from the interval of clutch sleeve teeth (5A1, 5A2; 5B1, 5B2) of the gearwheel (2) in which it is housed, in the direction of the clutch sleeve tooth of the gearwheel that is opposite to the one against which it is supported in the jaw-clutching configuration that corresponds to said end position of the declutching pilot unit.

14. A transmission device according to claim 13, wherein the cam surfaces (8A, 8B) of the declutching pilot unit (7) form a V series, with one of the branches of the V forming the first series of ramps, and another branch of the V forming the second series of ramps.

15. A transmission device according to claim 12, wherein the declutching pilot unit (7) has a shape of a wheel, housed inside the gearwheel (2) and comprising, on each of its surfaces, at least two cam surface series (8A1, 8A2; 8B1, 8B2), wherein said wheel is formed by assembling two cam-carrying plate wheels, and wherein the zones for connecting said plate wheels to one another are mounted to move angularly inside the openings (11) that are located along a circle that is arranged in the fabric of the gearwheel (2).

16. A transmission device according to claim 12, wherein each moving clutch sleeve (3A, 3B) has a shape of a sleeve that is mounted integrally in rotation with the wheel drive half-shaft (1A, 1B) that carries it by means of grooves, wherein said sleeve comprises—at or in the vicinity of one of its ends—a first plate that carries the cam surfaces (9A, 9B) that are complementary to the cam surfaces (8A, 8B) that are positioned on the declutching pilot unit (7) and a second plate that is coaxial to said first plate, and wherein said second plate carries the teeth (4A, 4B) of said clutch sleeve (3A, 3B).

17. A transmission device according to claim 1, wherein the declutching pilot unit (7) and each moving clutch sleeve (3A, 3B) each comprise, in their opposite parts, at least two series (8A1, 8A2; 9A1, 9A2); (8B1, 8B2; 9B1, 9B2) of cam surfaces activated selectively and offset angularly, one of the series of cam surfaces of the declutching pilot unit and each moving clutch sleeve being active in one of the end positions of the declutching pilot unit, and another of the series of cam surfaces being active in another end position of the declutching pilot unit.

18. A transmission device according to claim 1, wherein the declutching pilot unit (7) is mounted to be axially stationary relative to the gearwheel (2).

19. A transmission device according to claim 1, wherein the gearwheel (2) comprises two directions of rotation, one direction that corresponds to the forward operation of the vehicle, and another direction that corresponds to the reverse operation of the vehicle.

20. Automotive vehicle, wherein it is equipped with a transmission device according to claim 1.

* * * * *